(12) United States Patent
Conger

(10) Patent No.: US 7,687,706 B2
(45) Date of Patent: Mar. 30, 2010

(54) SOLAR ARRAY SUPPORT METHODS AND SYSTEMS

(76) Inventor: Steven Conger, 417 Main St., Carbondale, CO (US) 81623

( * ) Notice: Subject to any disclaimer, the term of this patent is extended or adjusted under 35 U.S.C. 154(b) by 212 days.

(21) Appl. No.: 11/856,521

(22) Filed: Sep. 17, 2007

(65) Prior Publication Data
US 2008/0061193 A1 Mar. 13, 2008

Related U.S. Application Data

(63) Continuation of application No. 10/606,204, filed on Jun. 25, 2003, now Pat. No. 7,285,719.

(51) Int. Cl.
*H01L 31/045* (2006.01)
(52) U.S. Cl. .............................. 136/245; 52/83; 52/173.3
(58) Field of Classification Search ......... 136/243–265; 52/82, 83, 173.3; 248/58, 60
See application file for complete search history.

(56) References Cited

U.S. PATENT DOCUMENTS

| | | |
|---|---|---|
| 3,704,560 A | 12/1972 | Ratliff, Jr. |
| 4,063,963 A | 12/1977 | Bond, Jr. |
| 4,071,017 A | 1/1978 | Russell, Jr. et al. |
| 4,216,762 A | 8/1980 | Klaila |
| 4,269,173 A | 5/1981 | Krueger et al. |
| D260,679 S | 9/1981 | Mayerovitch |
| 4,380,996 A | 4/1983 | Mengeringhausen |
| 4,386,600 A | 6/1983 | Eggert |
| 4,415,759 A | 11/1983 | Copeland et al. |
| 4,449,347 A | 5/1984 | Rooney |
| 4,487,989 A | 12/1984 | Wakefield et al. |
| 4,574,535 A | 3/1986 | Pabsch |
| 4,602,613 A | 7/1986 | Barr |
| 4,832,001 A | 5/1989 | Baer |
| D303,244 S | 9/1989 | Hanak |
| 5,058,565 A | 10/1991 | Gee et al. |
| 5,125,608 A | 6/1992 | McMaster et al. |
| 5,212,916 A | 5/1993 | Dippel et al. |
| 5,478,407 A | 12/1995 | Dorison et al. |
| D380,191 S | 6/1997 | White |

(Continued)

FOREIGN PATENT DOCUMENTS

DE 3643487 A * 6/1988

(Continued)

OTHER PUBLICATIONS

U.S. Appl. No. 12/143,624, filed Jun. 20, 2008, Conger.

(Continued)

*Primary Examiner*—Jessica L. Ward
*Assistant Examiner*—Kevin E Yoon
(74) *Attorney, Agent, or Firm*—Sheridan Ross PC

(57) ABSTRACT

Systems and methods for disposing and supporting a solar panel array are disclosed. In one embodiment, a system for supporting a solar panel array includes the use of support columns and cables suspended between the support columns, with the solar panels received by solar panel receivers that are adapted to couple to the cables. The solar panel array may then be used to provide power as well as shelter. Cooling, lighting, security, or other devices may be added to the solar panel array.

8 Claims, 13 Drawing Sheets

U.S. PATENT DOCUMENTS

| | | | |
|---|---|---|---|
| D408,554 | S | 4/1999 | Dinwoodie |
| 5,961,099 | A | 10/1999 | Thommen, Jr. |
| 6,091,016 | A | 7/2000 | Kester |
| 6,105,316 | A | 8/2000 | Bottger et al. |
| 6,397,869 | B1 | 6/2002 | Jennings |
| D469,399 | S | 1/2003 | Shugar |
| 6,563,040 | B2 | 5/2003 | Hayden et al. |
| D475,320 | S | 6/2003 | Hensley et al. |
| 7,285,719 | B2 | 10/2007 | Conger |
| 2005/0109384 | A1 | 5/2005 | Shingleton et al. |
| 2005/0141153 | A1 | 6/2005 | Mucci et al. |
| 2006/0124168 | A1 | 6/2006 | Momii et al. |
| 2008/0047546 | A1 | 2/2008 | Cummings |
| 2008/0057776 | A1 | 3/2008 | Cummings |
| 2008/0135095 | A1 | 6/2008 | Cummings et al. |
| 2008/0168981 | A1 | 7/2008 | Cummings et al. |
| 2009/0038672 | A1 | 2/2009 | Conger |

FOREIGN PATENT DOCUMENTS

| | | |
|---|---|---|
| DE | 4038646 A1 | 6/1992 |
| EP | 0373234 | 6/1990 |

OTHER PUBLICATIONS

U.S. Appl. No. 29/319,853, filed Jun. 16, 2008, Conger.
Foster + Partners "Hearst Headquarters", available at http://www.fosterandpartners.com/Projects/1124/Default.aspx, printerd Aug. 5, 2008, 11 pages.
"Sharp Provides Solar Panels for Winery's "Floatovoltaic" Solar Array", available at http://solarbuss.com/News/NewsNAPR1099.htm, dated May 29, 2008 (accessed Jun. 23, 2008), pp. 1-2.
U.S. Appl. No. 12/122,228, filed May 16, 2008, Conger.
U.S. Appl. No. 29/318,238, filed May 15, 2008, Conger.
"coolearth technology" coolearth, available at http://www.coolearthsolar.com/technology, date unknown, p. 1-2.
Examination Report for European Patent Application No. 04759693.7-1528, dated Apr. 27, 2007.
International Search Report for International (PCT) Patent Application No. PCT/US2004/008509, dated Oct. 22, 2004.
Written Opinion for International (PCT) Patent Application No. PCT/US2004/008509, dated Oct. 21, 2004.
International Preliminary Report on Patentability for International (PCT) Patent Application No. PCT/US2004/008509, dated Oct. 14, 2005.
Examiner's First Report for Australian Patent Application No. 2004231646, dated Jul. 23, 2008.
International Search Report for International (PCT) Patent Application No. PCT/US08/71414, dated Sep. 26, 2008.
Written Opinion for International (PCT) Patent Application No. PCT/US08/71414, dated Sep. 26, 2008.
U.S. Appl. No. 12/466,331, filed May 14, 2009, Conger.
International Search Report for International (PCT) Patent Application No. PCT/US09/44060, mailed Jun. 24, 2009.
Written Opinion for International (PCT) Patent Application No. PCT/US09/44060, mailed Jun. 24, 2009.
Baumgartner et al. "Solar Wings a New Lightweight PV Tracking System", 23re Eu PVSEC, Valencia, Sep. 4, 2008, invited talk 4DO.9.5.
Solyndra web pages available at http://ww.solyndra.com, printed May 11, 2009, 7 pages.
"Single Axis SunPower T20 Trackers", date unknown, 5 pages.

* cited by examiner

SOLAR ARRAY SUPPORT METHODS AND SYSTEMS

RELATED APPLICATIONS

This application is a continuation application of U.S. application Ser. No. 10/606,204, filed Jun. 25, 2003, which claims priority to co-pending provisional application Ser. No. 60/459,711, filed Apr. 2, 2003, entitled "SOLAR SCULPTURE" ENERGY AND UTILITY ARRAY, which is incorporated herein by reference.

FIELD

The present invention is related to the field of solar energy capture.

BACKGROUND

Present systems for supporting solar panels tend to be bulky and expensive. Given the size and weight of such systems, implementation of solar panel arrays in remote locations is difficult and expensive. When large equipment is required, installation of a solar panel array in an environmentally sensitive area without significant impact on surrounding habitat becomes very difficult. Typically, such support systems do not allow for secondary uses of the solar panel arrays.

SUMMARY

The present invention, in an illustrative embodiment, includes a system for supporting a solar panel array. The system includes two pairs of vertical columns, where each pair includes a tall column and a short column. The pairs are placed a distance apart, and a first support cable is secured between the short columns and a second support cable is secured between the tall columns. A guy wire or other anchoring devices may be attached to the columns to provide lateral support to the columns against the tension created by suspending the support cables between the spaced columns. The system further includes a solar panel receiver adapted to be secured to the two support cables. The solar panel receiver may be adapted to receive any type of solar panel or several panels. The receiver may include a maintenance catwalk or other access providing design element.

In another illustrative embodiment, the present invention includes a system for providing both shelter and electricity. The system may again include columns, support cables, and one or more solar panel receivers as in the illustrative solar panel array support system noted above. The system further includes a number of solar panels secured to or received by the solar panel receiver. The columns may be sized to allow an activity to occur beneath the solar panel receivers. For example, if the desired activity is that of providing a shaded parking lot, the columns may have a height allowing vehicles to be parked beneath the solar panel receivers, and the columns may be spaced apart to create a sheltered area sized to correspond to the desired area of the parking lot.

In yet another illustrative embodiment, the present invention includes a system for supporting a solar panel array, the system comprising four anchor points, with a first support cable suspended between a first pair of anchor points, and a second support cable suspended between a second pair of anchor points. The system further includes a solar panel receiver adapted to be supported by the first and second support cables, the solar panel receiver also adapted to receive one or more solar panels.

In a further embodiment, the present invention includes methods of supporting a solar panel array. The methods include the step of using cables to support solar panel receivers adapted to receive one or more solar panels. In yet another embodiment, the present invention includes a method of creating a sheltered space which makes use of a solar panel array that creates electricity, where the method also includes using the electricity to cool an area beneath the array.

DETAILED DESCRIPTION

The following detailed description should be read with reference to the drawings. The drawings, which are not necessarily to scale, depict illustrative embodiments and are not intended to limit the scope of the invention.

Figure 1:
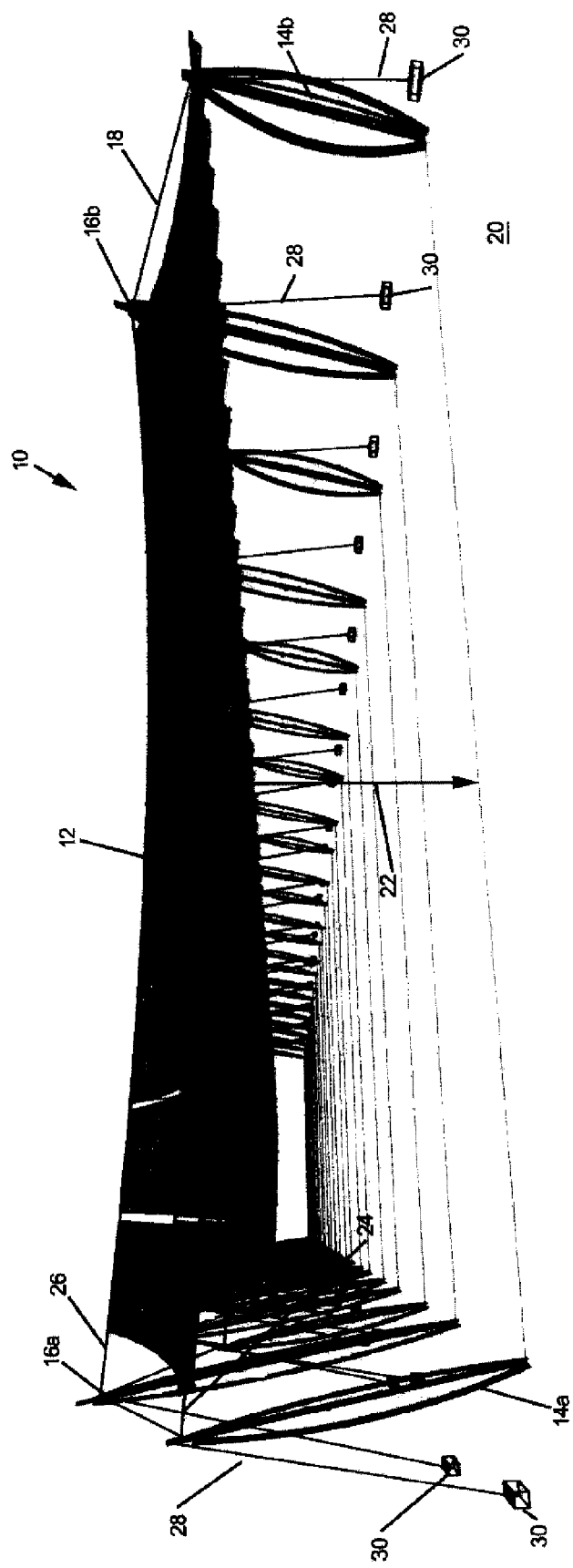
FIG. 1 is a perspective view of a solar panel array supported in accordance to an illustrative embodiment.

FIG. 1 is a perspective view of a solar panel array supported in accordance with an illustrative embodiment. A solar panel array 10 is illustrated as including a number of solar panel receivers 12. Pairs of short columns 14a, 14b and tall columns 16a, 16b are aligned with one another. The pairs of columns 14a, 16a and 14b, 16b may also be connected by a stability cable 18 that runs along the edges of the array 10. The solar panel receivers 12 are held above a surface 20 at a height 22 defined by the columns 14a, 14b, 16a, 16b. A first cable 24 is suspended between the short columns 14a, 14b, and a second cable 26 is suspended between the tall columns 16a, 16b. The solar panel receivers 12 are designed to be supported by the cables 24, 26, so that the overall design is a lightweight, flexible and strong solar panel array 10 that leaves plenty of usable, sheltered space below. Anchor lines 28 and anchors 30 may be used to provide further support and to enable the use of lightweight columns 14a, 14b, 16a, 16b.

The surface 20 may be, for example, a generally flat area of ground, a picnic area in a park, a parking lot, or a playground. The height 22 may be chosen to allow for a desired activity to occur beneath the array 10. For example, if a parking lot is beneath the array 10, the height 22 may be sufficient to allow typical cars and light trucks to be parked underneath the array 10, or the height may be higher to allow commercial trucks to be parked beneath the array 10. If a playground is beneath the array 10, the array 10 may have a height 22 chosen to allow installation of desired playground equipment.

Any suitable material and/or structure may be used for the columns 14a, 14b, 16a, 16b including, for example, concrete or metal, or a simple pole or a more complicated trussed column. In some embodiments a footing may be placed beneath the base of each of the columns 14a, 14b, 16a, 16b to provide stability on relatively soft ground. The cables 18, 24, 26 and anchor lines 28 may be made of any material and design as well including, for example, metals, composites, and/or polymeric fibers. In one embodiment the primary material used in the columns 14a, 14b, 16a, 16b, the cables 24, 26 and the anchor lines 28 is steel. Because the primary support technology for the array 10 is the cables 24, 26 under tension, the design is both visually and literally lightweight.

While FIG. 1 illustrates an embodiment wherein the columns 14a, 14b, 16a, 16b are either "short" or "tall", in other embodiments the columns may all be of the same height. No particular angle of elevation is required by the present invention, however, it is contemplated that, depending upon the latitude, time of year, and perhaps other factors, certain angles may be more effective in capturing incident sunlight.

Figure 2:
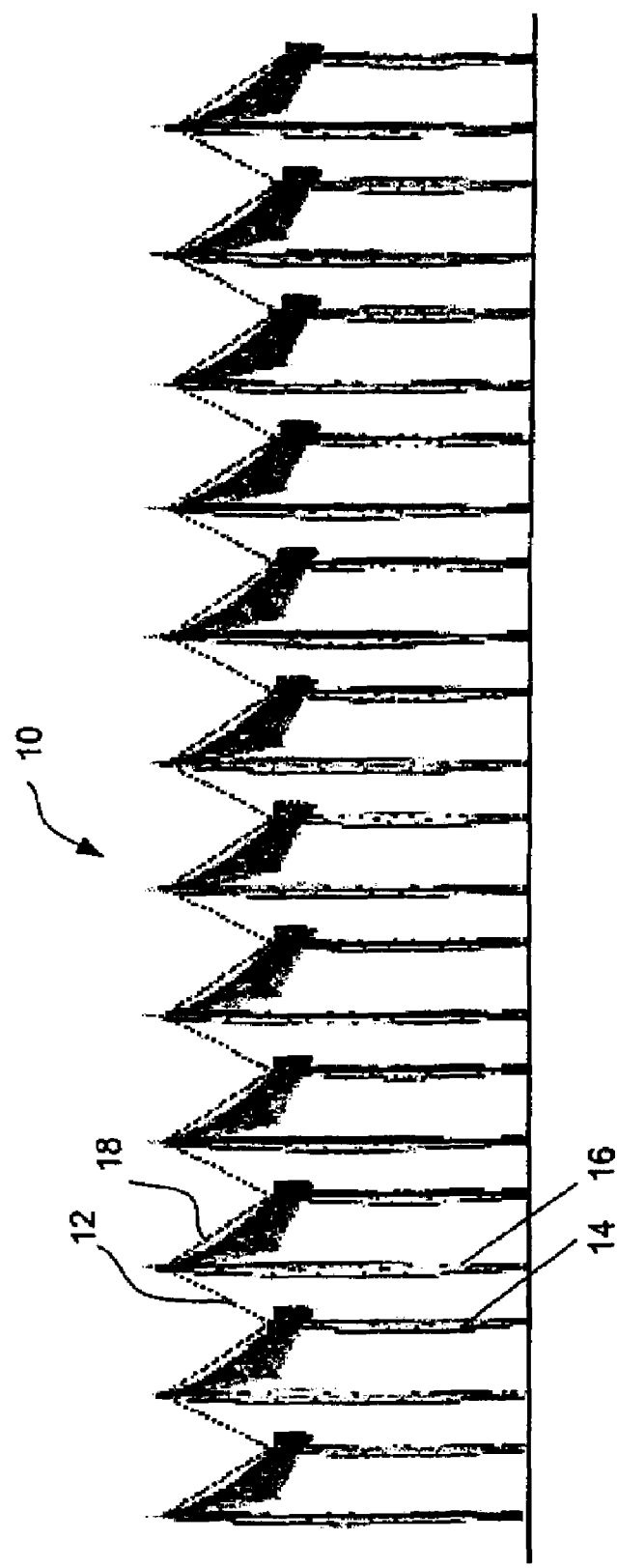
FIG. 2 is a longitudinal section view of a solar panel array supported in accordance to an illustrative embodiment.

FIG. 2 is a longitudinal section view of a solar panel array supported in accordance with an illustrative embodiment. The array 10 illustrates the relative spacing of rows of the array 10, and helps to show how the stability cable 18 connects the columns 14, 16 of the array 10. The stability cable 18 may be coupled to an anchor member as well, though this is not shown in FIG. 2. It can be seen that the relative heights of the columns 14, 16 help to define the angle that the solar panel receivers 12 have with respect to the incident sunlight. In some embodiments, the columns 14, 16 or the solar panel receivers 12 may include a mechanism allowing for adjustment of the angle of the solar panel receivers 12. To do so, for example, the length of the columns 14, 16 may be adjusted, or the solar panel receivers 12 may include a mechanism for changing the angle of individual panels or entire receivers 12. For example, with the changing of seasons, the height of the sun in the sky may vary sufficiently to affect the efficiency of the solar panel receivers 12, and so it may be desirable to vary the angle of the receivers 12. Also, as the sun moves during the day it may be desirable to change the angle of the receivers 12 to improve light reception.

Figure 3:
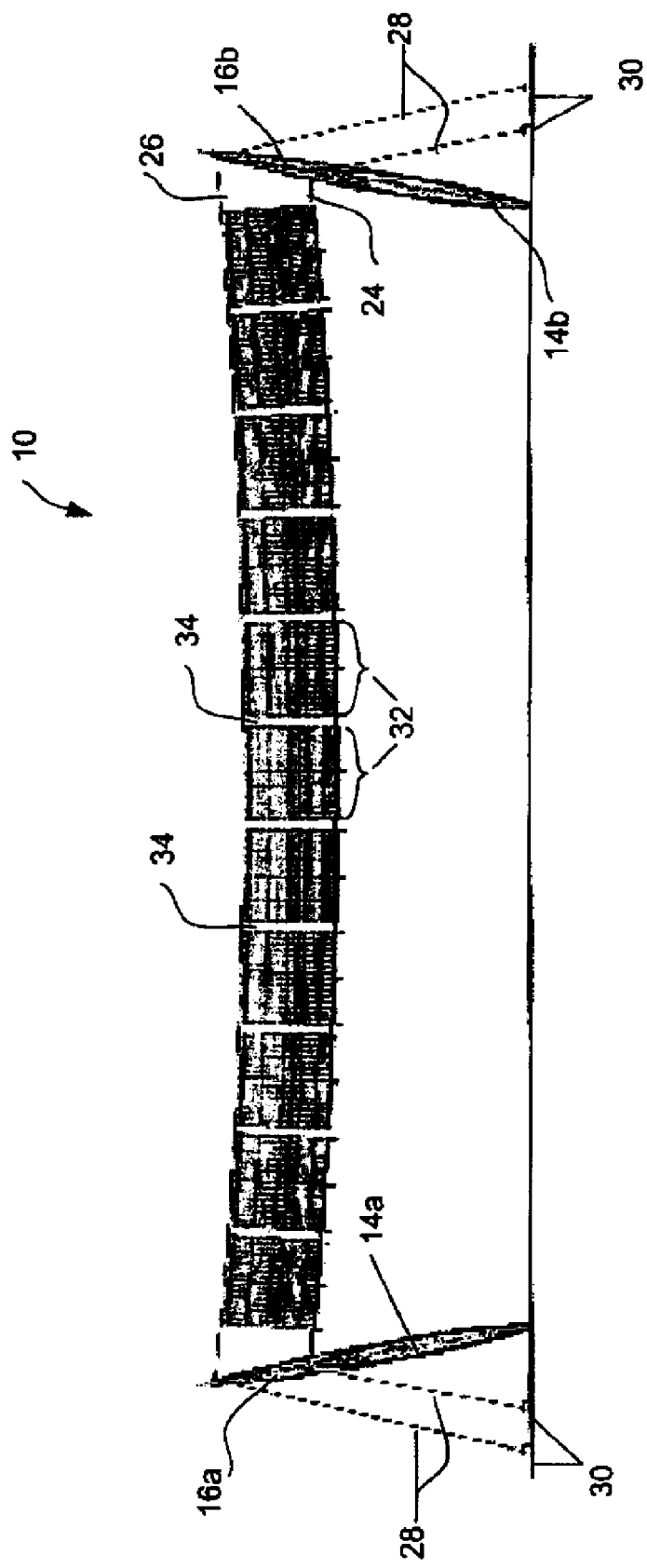
FIG. 3 is a horizontal section view of a solar panel array supported in accordance to an illustrative embodiment.

FIG. 3 is a horizontal section view of a solar panel array supported in accordance with an illustrative embodiment. As illustrated, the array 10 is supported by short columns 14a, 14b, tall columns 16a, 16b, and cables 24, 26. Anchor lines 28 and anchors 30 are provided to improve stability and allow the use of lightweight columns 14a, 14b, 16a, 16b. The solar panel receivers 12 are illustrated as pairs of individual units 32 having gaps 34 between each unit 32. The gaps 34 allow for air movement, reducing the amount of wind resistance of the array 10. The gaps 34 also allow for relative movement of the units 32 since the cables 24, 26 are somewhat flexible.

Figure 4:
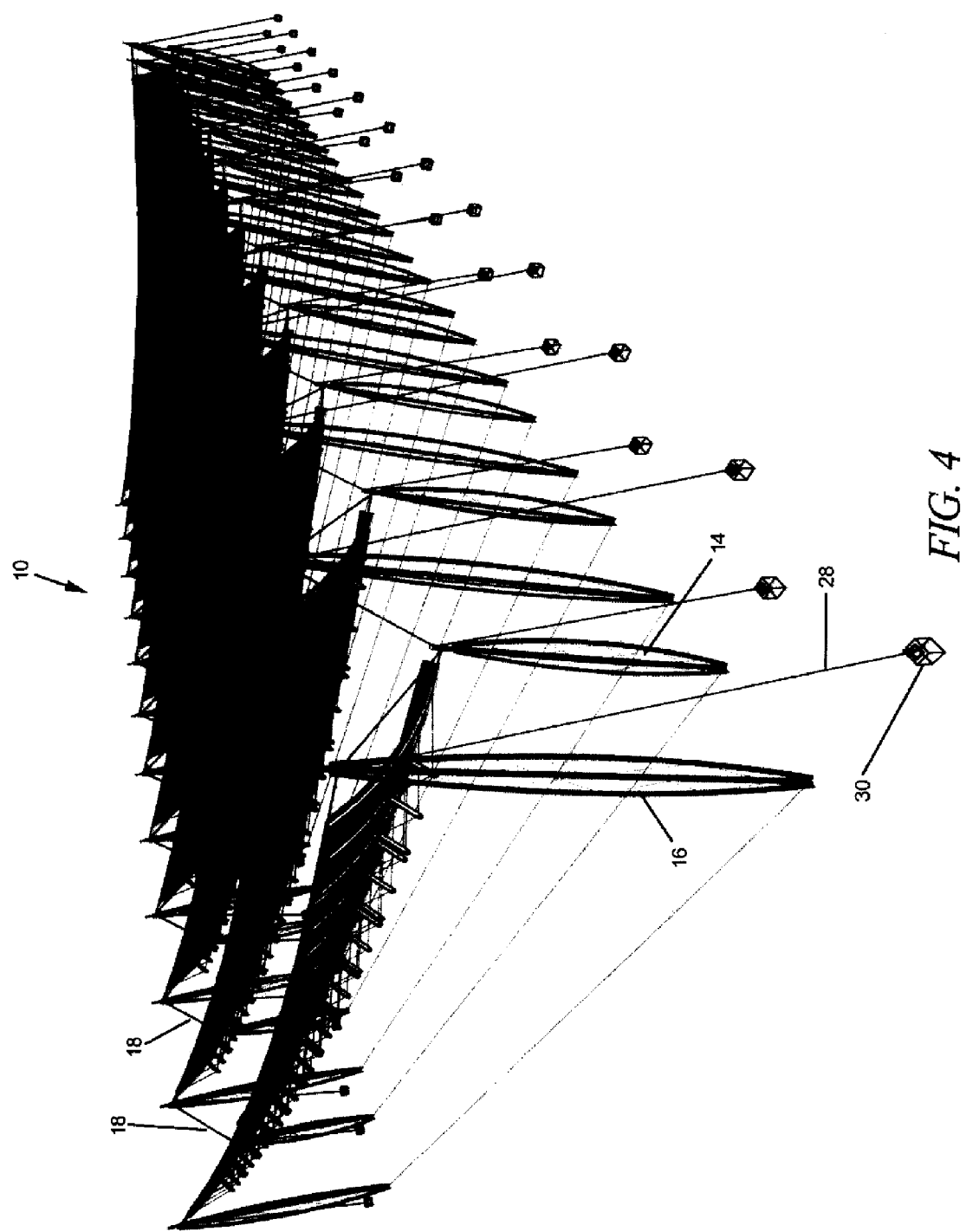
FIG. 4 is a perspective rear view of an illustrative solar panel array.

FIG. 4 is a perspective rear view of an illustrative solar panel array. It can be seen that the stability cables 18 are coupled in various configurations along the length of the array 10, linking the short columns 14 and tall columns 16 to create a linked structure. The array 10 also includes various anchor cables 28 and anchor points 30, including at the end of the array 10 that may help anchor the stability cables 18.

Figure 5:
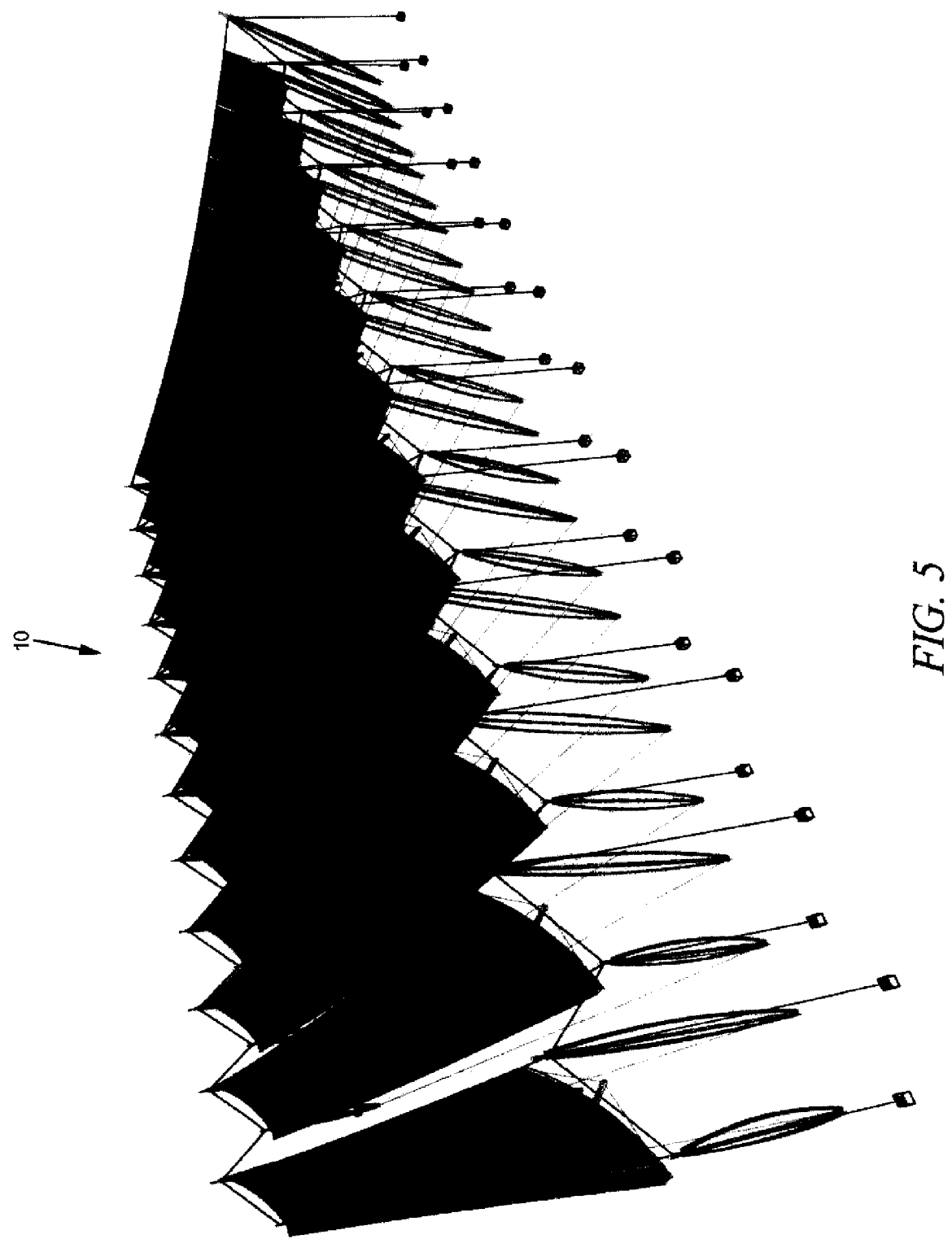
FIG. 5 is a perspective side view of an illustrative solar panel array.

FIG. 5 is a perspective side view of an illustrative solar panel array 10 which is similar to that shown in FIGS. 1-4. It can be appreciated from the several views of FIGS. 1-5 that the illustrative array 10 provides a readily usable shelter that is amenable to a variety of activities.

Figure 6:
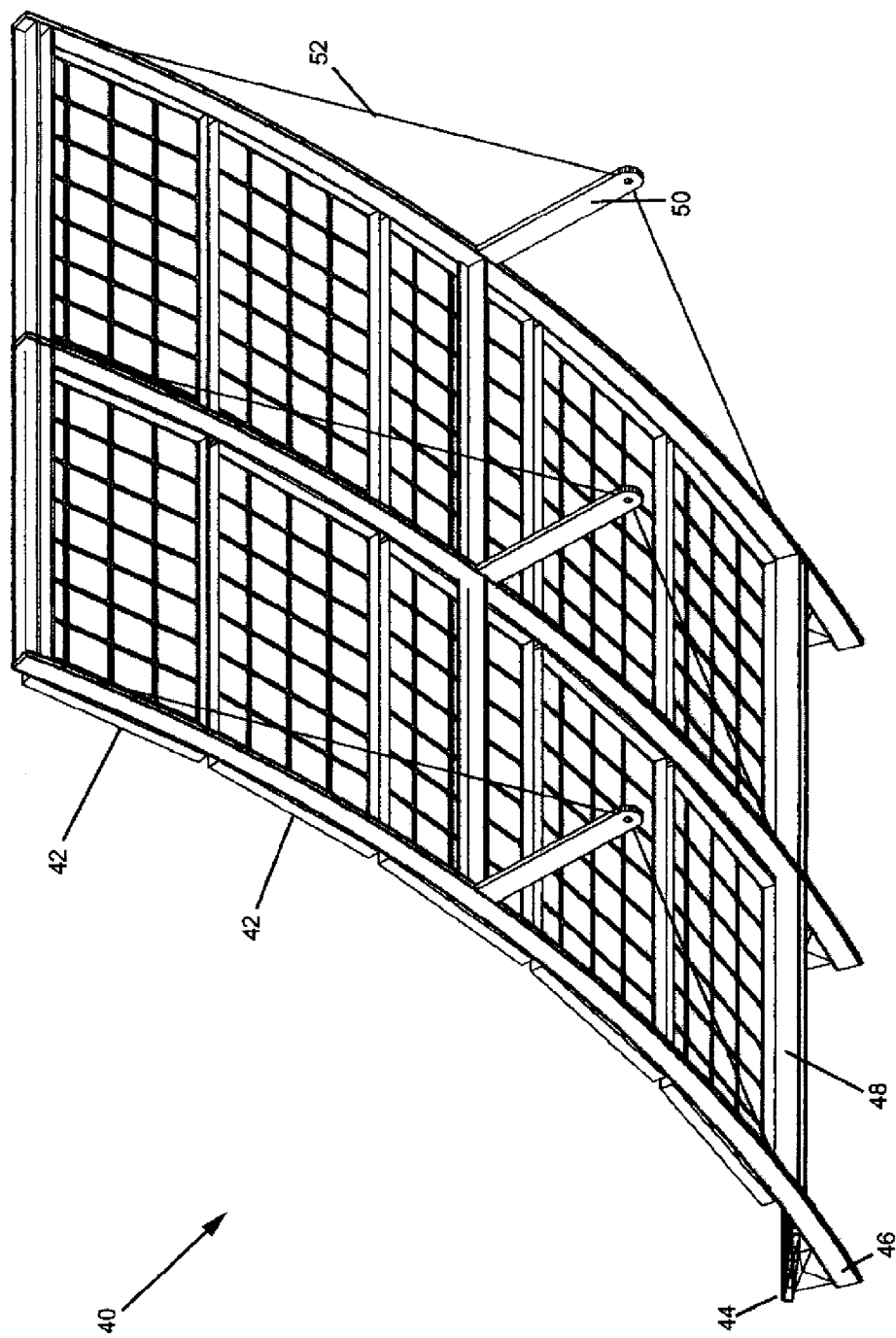
FIG. 6 is a rear perspective view of an illustrative pod showing the use of several struts and cords to create a rigid member.
Figure 7:
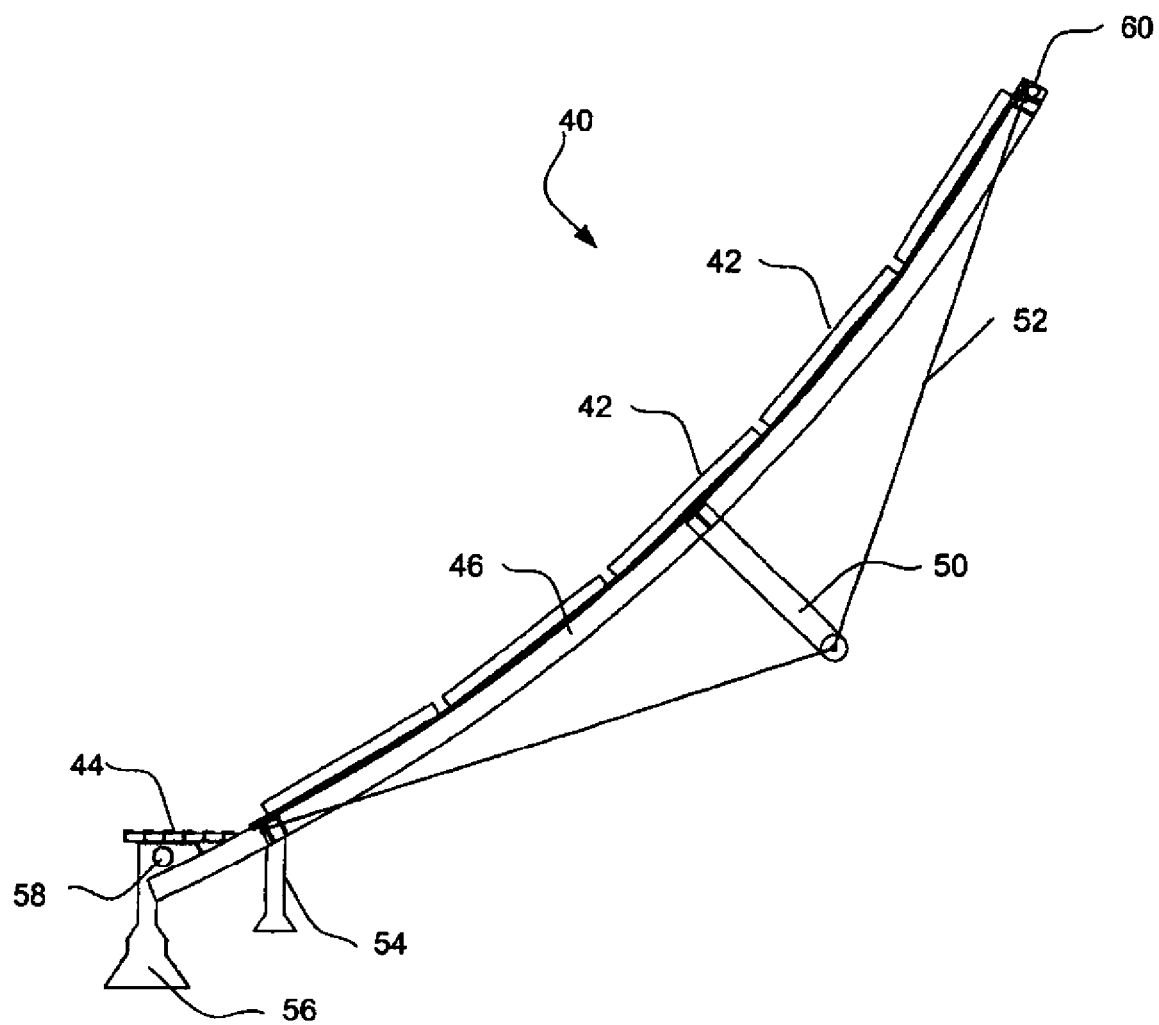
FIG. 7 is a section view of an illustrative pod including several optional features.

FIGS. 6 and 7 illustrate a pod which may be used as a solar panel receiver. The "pods" illustrated herein are intended to provide an example of a solar panel receiver that may be used with the present invention. The solar panel receiver may, of course, have a variety of other structures to perform its function of holding one or more solar panels while being adapted to couple to support cables as illustrated herein.

FIG. 6 is a rear perspective view of an illustrative pod showing the use of several struts and cords to create a rigid member. The pod 40 is shown with several solar panels 42 which may be, for example, photovoltaic panels. A maintenance walkway 44 is included as an optional feature of the pod 40. Several curved struts 46 extend vertically along the back of the pod 40, with several horizontal struts 48 coupled by moment connections to the curved struts 46. By using moment connections, the overall structure becomes a rigid yet lightweight frame for receiving the solar panels 42. A center strut 50 extends out of the back of the pod 40, and is connected to a truss cable 52 which provides another lightweight yet highly supportive aspect of the structure. The center strut 50 and truss cable 52 allow a lightweight curved strut 46 to be used, lending support to the center of the curved strut 46.

In another embodiment, rather than creating electricity with photovoltaic panels, the present invention may also be used to support solar panels that collect solar thermal energy. The solar thermal collectors could be mounted on the solar panel receivers illustrated herein, and thermal energy could be collected by the use of a heat transfer medium pumped through flexible tubing. In one such embodiment, glycol may be used as a mobile heat transfer medium, though any suitable material may be used.

FIG. 7 is a section view of an illustrative pod including several optional features. The pod 40 is shown with solar panels 42 in place. The optional maintenance walkway 44 is again shown on the lower portion of the curved member 46. The center strut 50 and truss cable 52 again provide support to the curved member 46. The pod 40 may include, for example, a mister 54 that can be used to provide evaporative cooling to the sheltered area beneath a solar array using the pod 40. The pod 40 may also include a light 56 or security camera, for example. In one embodiment, a solar array may be used to provide a parking shelter, with the solar array storing electricity during the day using, for example, fuel cells or batteries, and then discharging the stored electricity by lighting the shelter created by the solar array during the evening.

Two cable receivers 58, 60 are also illustrated. While shown in the form of a simple opening that a cable may pass through, the cable receivers 58, 60 may take on a number of other forms. For example, the cable receivers 58, 60 may include a mechanism for releasably locking onto a cable. It can be appreciated from FIGS. 6 and 7 that the illustrative pod 40 is designed so that rain is readily directed off of the solar panels, as the water will run down the curve of the pod 40. In other embodiments, the pod 40 may be more or less flat, rather than having the curvature shown, or may have a different curvature than that shown.

Figure 8:
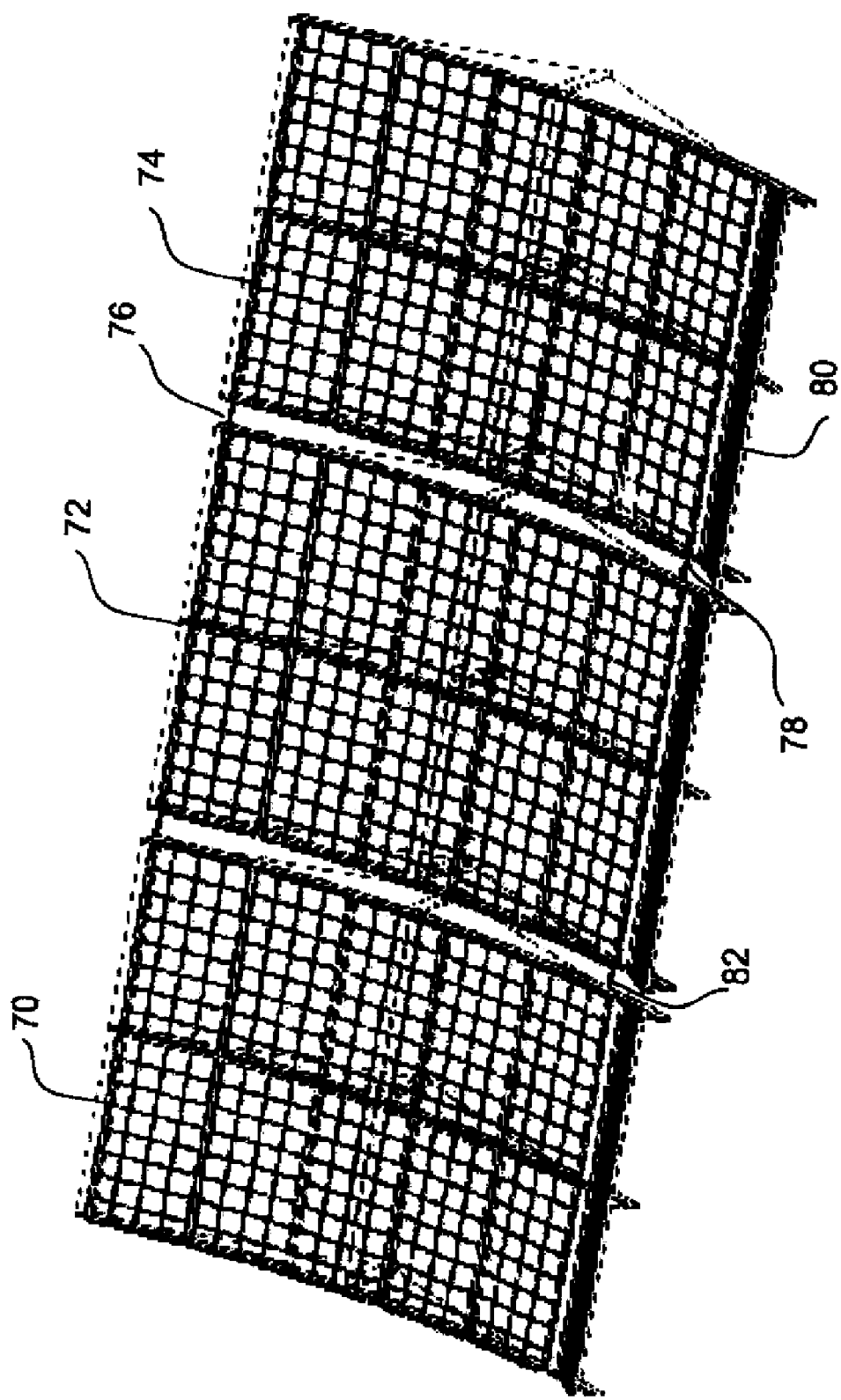
FIG. 8 is a front perspective view of several solar panel receivers linked together.

FIG. 8 is a perspective front view of several solar panel receivers linked together. A first solar panel receiver 70, a second solar panel receiver 72, and a third solar panel receiver 74 are supported by an upper support cable 76 and a lower support cable 78. An optional maintenance walkway 80 is illustrated as well. Also included is a flexible electric cable 82 that allows for transmission of electrical power from each of the solar panel receivers 70, 72, 74 when solar energy is captured. The flexible electric cable 82 may also serve to distribute power to devices such as security cameras or lighting that may be provided beneath the solar panel receivers 70, 72, 74.

Figure 9:
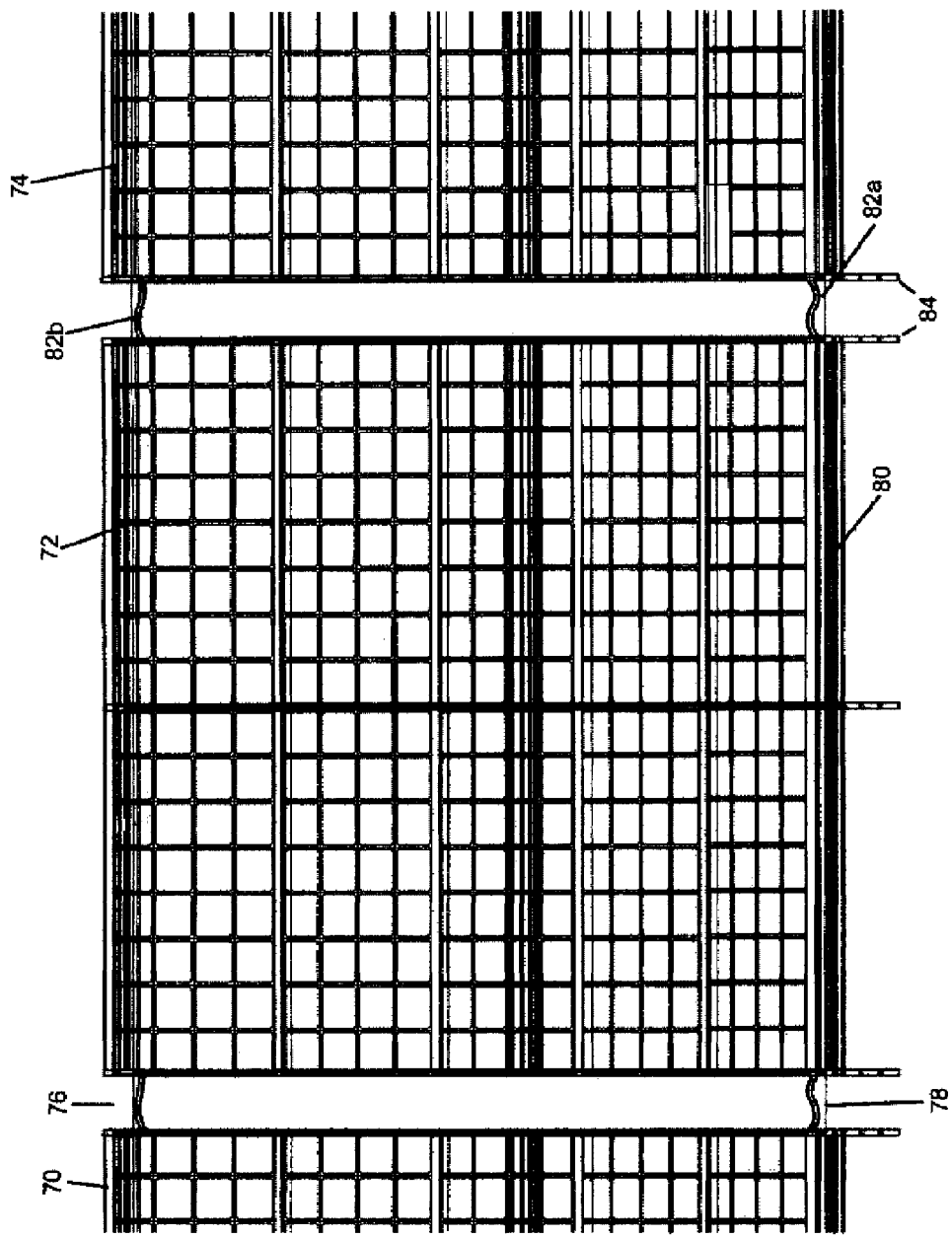
FIG. 9 is a front elevation view of several solar panel receivers linked together.

FIG. 9 is a front elevation view of several solar panel receivers linked together. Again, the solar panel receivers 70, 72, 74 are shown supported by an upper support cable 76 and a lower support cable 78, and include an optional maintenance walkway 80. Two flexible electric cables 82a, 82b are illustrated in FIG. 9, and may serve the same purposes as that noted above with respect to FIG. 8. It is clearly shown in FIG. 9 that there is a gap 84 between the solar panel receivers 70, 72, 74. The gap 84 allows the solar panel receivers 70, 72, 74 to move independently, rendering the overall array less rigid and more likely to withstand high winds. The gap 84 also prevents neighboring solar panel receivers (i.e. 70 and 72 or 74 and 74) from damaging one another in windy conditions.

Depending on the desired output of the array, the flexible electric cables 82a, 82b may be coupled to a substation for gathering produced power and providing an output. For example, the electricity gathered is inherently direct current power, an array as illustrated herein may be easily used to charge batteries or fuel cells. The power may also be used with an electrolyzer to produce hydrogen and oxygen, with the hydrogen available for use as a fuel.

Figure 10:
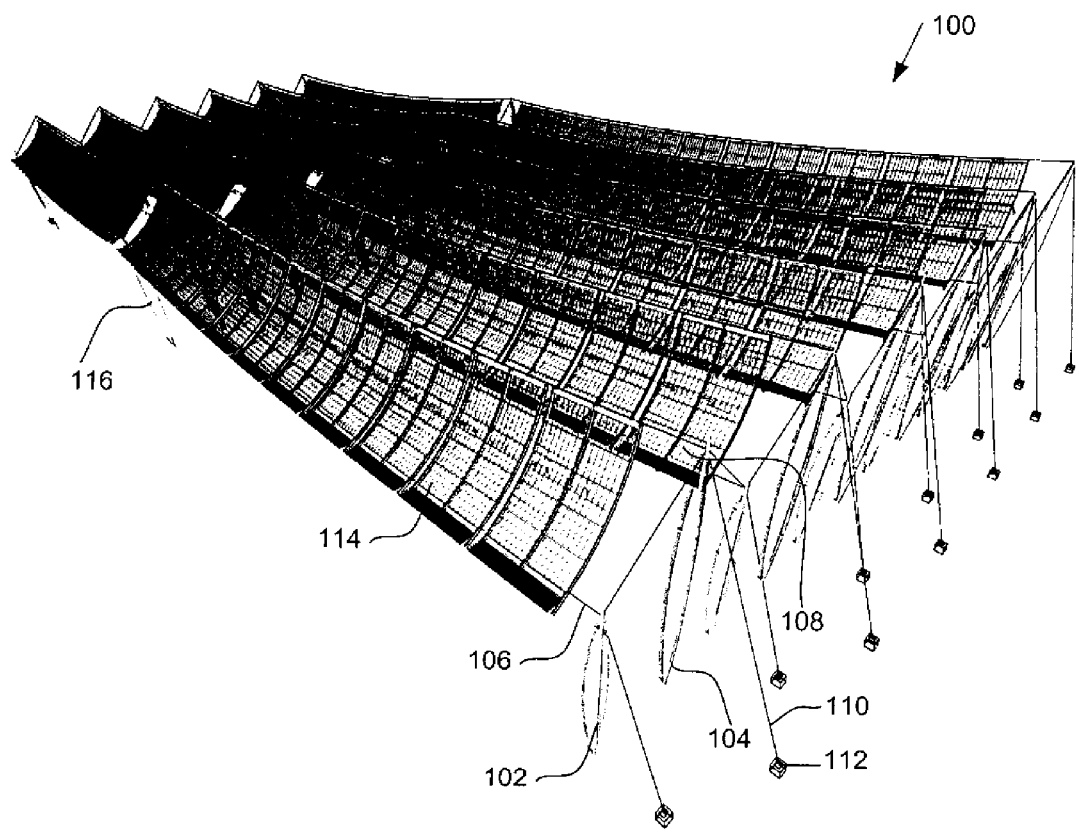
FIG. 10 is a front and side perspective view of an illustrative solar panel array including a center support member.

FIG. 10 is a perspective front and side view of an illustrative solar panel array including a center support member. The illustrative array 100 includes a number of alternating short columns 102 and tall columns 104, with support cables 106, 108 suspended from the columns 102, 104. Anchor lines 110 and anchors 112 provide additional support, and the array 100 supports a number of solar panel receivers 114. The further addition in FIG. 10 is the inclusion of a center support 116, which allows for a longer span to be covered between the outer columns 102, 104, reducing the need to place additional anchors 112. Further, because the center support 116 does not have to provide stability against lateral movement, and only needs to provide vertical support, the center support 116 may be of an even lighter weight construction than the outer columns 102, 104.

Figure 11:
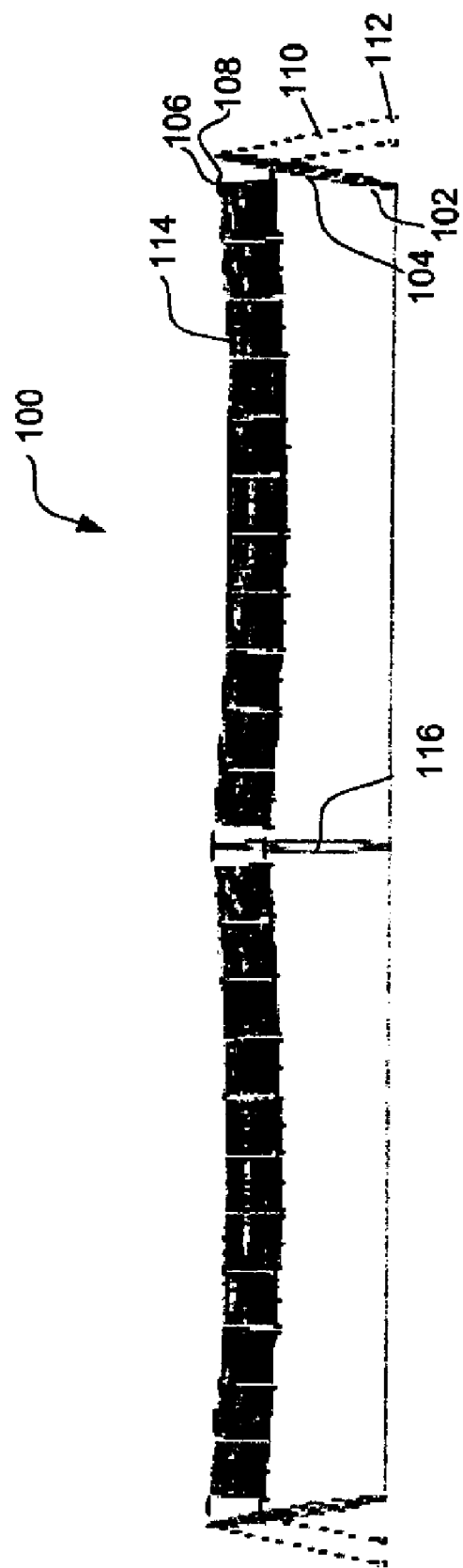
FIG. 11 is a section view showing an illustrative solar panel array including a center support member.

FIG. 11 is a section view showing an illustrative solar panel array including a center support member. Again, the array 100 is supported by the use of a short column 102, a tall column 104, a lower support cable 106 and an upper support cable 108. The array 100 is stabilized in part by the use of anchor lines 110 and anchors 112, and a number of solar panel receivers 114 are supported. The center column 116 provides a central support, but is not required to add to the lateral stability of the array 100, because there are portions of the array pulling equally on both sides of the center column 116.

Figure 12:
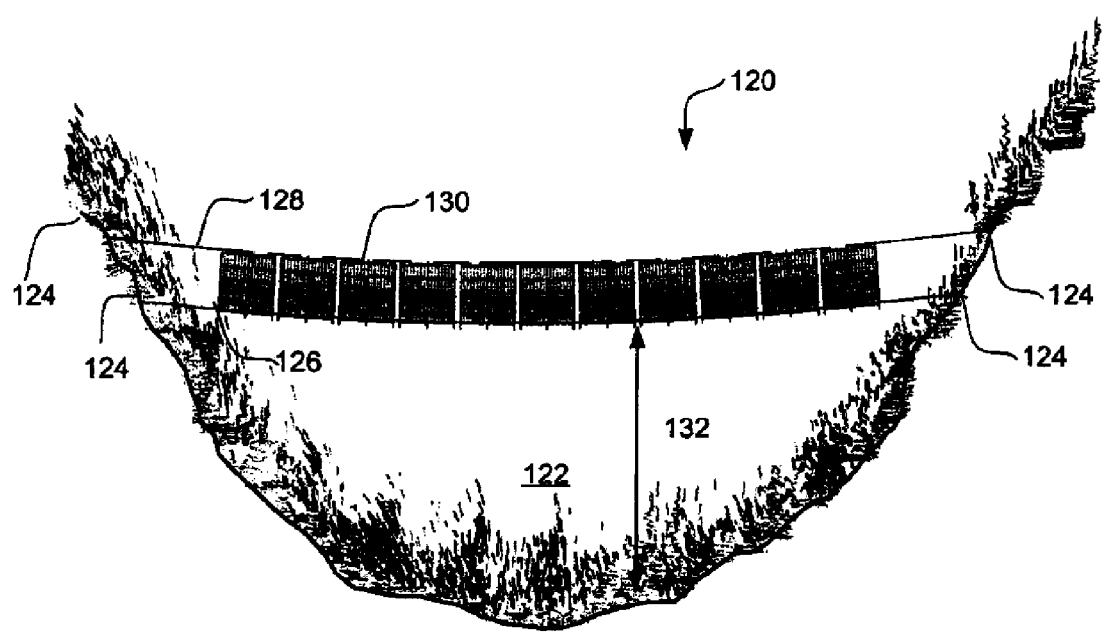
FIG. 12 is a front elevation view of an illustrative solar panel array suspended across a valley.

FIG. 12 is a front elevation view of an illustrative solar panel array suspended across a valley. An array 120 is suspended across a valley 122 by the use of four anchors 124 that enable two support cables 126, 128 to be suspended across the valley 122. A number of solar panel receivers 130 are supported by the support cables 126, 128. By suspending the array 120 across the valley 122, a desired height 132 above the valley floor can be achieved by the array. The height 132 may be sufficient to allow wildlife to pass below.

A number of potential environmental benefits of this type of structure can be identified, including that the structure provides a quiet and safe energy production array, the structure provides shade and/or shelter, and the structure can be installed without requiring a large amount of heavy machinery. The use of an array over eroding ground may encourage foliage growth in highly exposed locations, slowing erosion.

Figure 13:
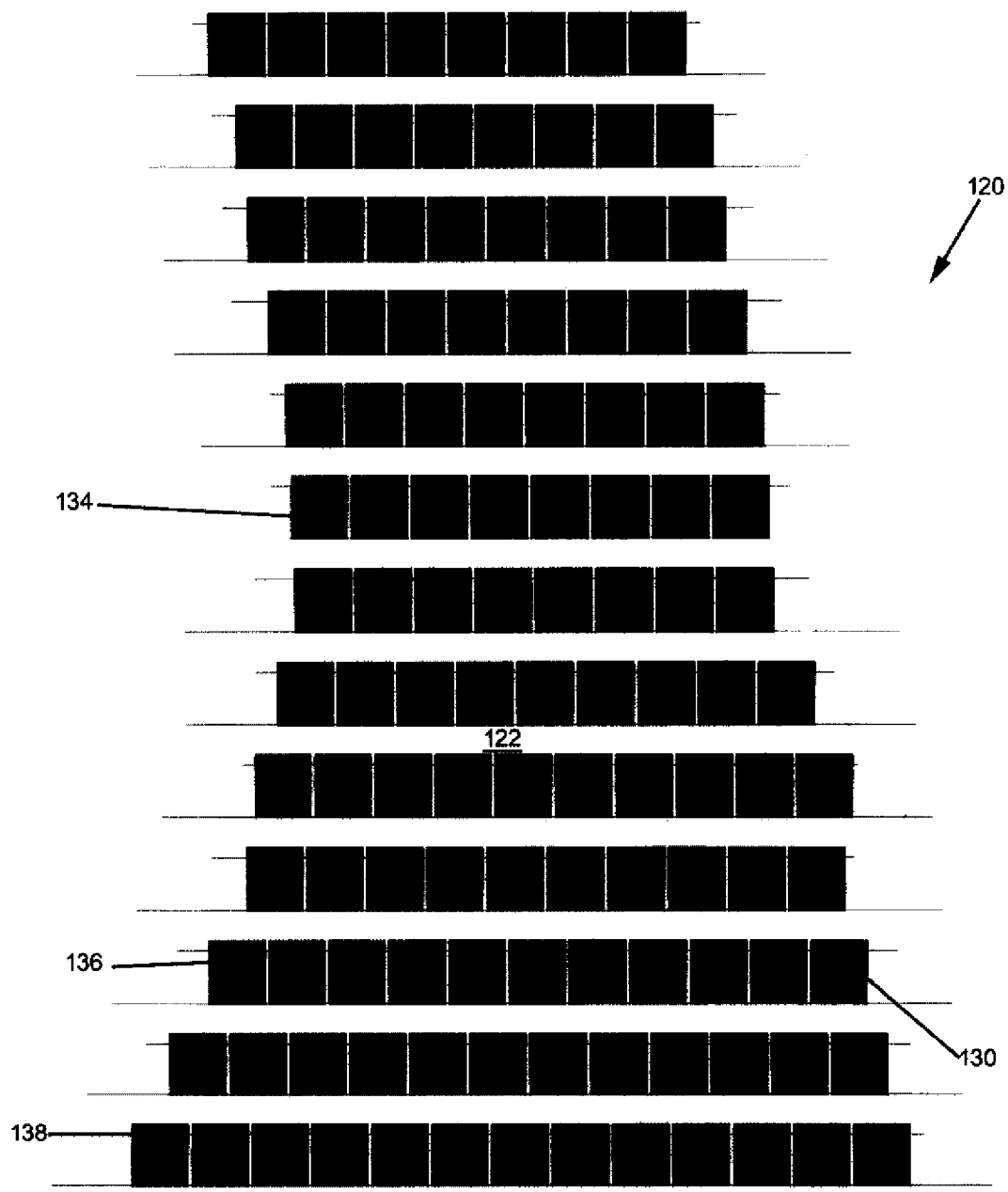
FIG. 13 is an overhead plan view of an illustrative solar panel array suspended across a valley.

FIG. 13 is an overhead plan view of an illustrative solar panel array suspended across a valley. It can be seen that the array 120 is designed to match the shape of the valley 122. In particular, the array 120 includes a number of individual lines of solar panel receivers 130. By varying the number of solar panel receivers 130 suspended by each pair of support cables, a relatively short line 134 can match a relatively narrow place in the valley 122, while longer lines 136, 138 span a wider portion of the valley 122.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A system for supporting a solar panel array across a natural gap to include a valley, comprising:
    at least four anchors;
    a first support cable extending between and directly connected to a first anchor and a second anchor;
    a second support cable extending between and directly connected to a third anchor and a fourth anchor;
    a number of solar panels;
    one or more panel receivers, each panel receiver adapted to receive the number of solar panels, and wherein the panel receiver comprises a number of curved struts and a number of horizontal struts connected to the curved struts with moment connections.

2. The system of claim 1 wherein the first cable and the second cable are generally parallel in their axial directions.

3. The system of claim 1 wherein the first anchor and the second anchor are spaced apart a first distance and the third anchor and the fourth anchor are spaced apart the first distance.

4. The system of claim 3 wherein the first anchor and the third anchor are spaced apart a second distance and the second anchor and the fourth anchor are spaced apart the second distance, wherein the second distance is different than the first distance.

5. The system of claim 4 wherein the distance above a valley floor varies along a length of the cables.

6. The system of claim 1 wherein the panel receiver further comprises:
    a number of center struts attached near the middle of the curved struts; and
    a number of cable trusses having a first end and a second end, the cable trusses being connected at the first end to one end of a curved strut and at the second end to an opposite end of the same curved strut;
    wherein the cable trusses are secured between the first end and the second end to the center struts.

7. A system for supporting a solar panel array, the system comprising: first, second, third and fourth anchor points; a first support cable suspended between the first and second anchor points; a second support cable suspended between the third and fourth anchor points; and a plurality of solar panel receivers each adapted to receive a solar panel, the solar panel receivers being secured to the first support cable and the second support cable; and wherein each panel receiver includes a number of curved struts and a number of horizontal struts connected to the curved struts.

8. The system of claim 7 wherein each panel receiver further comprises a number of center struts attached near the middle of the curved struts; and a number of cable trusses having a first end and a second end, the cable trusses being connected at the first end to one end of a curved strut and at the second end to an opposite end of the same curved strut; wherein the cable trusses are secured between the first end and the second end to the center struts.

* * * * *